United States Patent
Nauka et al.

(10) Patent No.: US 11,465,205 B2
(45) Date of Patent: Oct. 11, 2022

(54) REDUCING STRESSES IN METAL LAYERS

(71) Applicant: Hewlett-Packard Development Company, L.P., Spring, TX (US)

(72) Inventors: Krzysztof Nauka, Palo Alto, CA (US); Chris Paul Schodin, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 167 days.

(21) Appl. No.: 16/470,293

(22) PCT Filed: Apr. 10, 2017

(86) PCT No.: PCT/US2017/026767
§ 371 (c)(1),
(2) Date: Jun. 17, 2019

(87) PCT Pub. No.: WO2018/190787
PCT Pub. Date: Oct. 18, 2018

(65) Prior Publication Data
US 2020/0023432 A1   Jan. 23, 2020

(51) Int. Cl.
*B22F 3/105* (2006.01)
*B22F 7/02* (2006.01)
(Continued)

(52) U.S. Cl.
CPC ............ *B22F 3/105* (2013.01); *B22F 3/003* (2013.01); *B22F 7/02* (2013.01); *B22F 12/43* (2021.01); *B33Y 30/00* (2014.12); *B33Y 10/00* (2014.12); *B33Y 40/00* (2014.12); *B33Y 70/00* (2014.12); *C23C 24/04* (2013.01); *C23C 24/10* (2013.01)

(58) Field of Classification Search
CPC ... B22F 12/43; B22F 7/02; B22F 7/04; B23K 26/066
See application file for complete search history.

(56) References Cited

U.S. PATENT DOCUMENTS 5,494,781 A * 2/1996 Ohtani ................ B23K 26/067
                                                          430/311
5,567,554 A * 10/1996 Jensen ............... H01Q 15/0013
                                                          343/873
(Continued)

FOREIGN PATENT DOCUMENTS

CN         106488820         3/2017
EP         0180101 A2 *      5/1986   ......... C23C 18/1882
(Continued)

OTHER PUBLICATIONS

Becker et al. ("Polymer microfluidic devices." Talanta 56.2 (2002): 267-287.) (Year: 2002).*
(Continued)

*Primary Examiner* — Anthony J Zimmer
*Assistant Examiner* — Ricardo D Morales
(74) *Attorney, Agent, or Firm* — Fabian VanCott

(57) ABSTRACT

A system including: a polymer substrate with a thermal conductivity of less than 0.5 W/(m-k); a spreader to form a layer of metal particulate on the polymer substrate; a mask applicator to apply a mask to a portion of the layer of metal particulate; and a pulsed irradiation light source to fuse a portion of the layer of metal particulate not covered by the mask.

13 Claims, 6 Drawing Sheets

(51) Int. Cl.
*B33Y 30/00* (2015.01)
*B22F 3/00* (2021.01)
*B22F 12/43* (2021.01)
*B33Y 10/00* (2015.01)
*B33Y 40/00* (2020.01)
*B33Y 70/00* (2020.01)
*C23C 24/04* (2006.01)
*C23C 24/10* (2006.01)

(56) References Cited

U.S. PATENT DOCUMENTS

| | | | | |
|---|---|---|---|---|
| 6,054,192 | A * | 4/2000 | Otsuka | B23K 26/066 |
| | | | | 427/555 |
| 6,410,191 | B1 * | 6/2002 | Nistler | G03F 1/30 |
| | | | | 430/5 |
| 7,955,783 | B2 * | 6/2011 | Shrader | H05K 3/0082 |
| | | | | 430/311 |
| 8,357,618 | B2 * | 1/2013 | Bencher | H01L 21/3146 |
| | | | | 438/689 |
| 8,404,160 | B2 | 3/2013 | Li et al. | |
| 9,017,589 | B2 | 4/2015 | Kritchman et al. | |
| 9,026,957 | B2 * | 5/2015 | Liu | G03F 1/68 |
| | | | | 716/54 |
| 9,469,135 | B2 | 10/2016 | Wejkamp et al. | |
| 9,505,058 | B2 | 11/2016 | Wu et al. | |
| 2009/0191356 | A1 * | 7/2009 | Lee | H05K 3/12 |
| | | | | 427/535 |
| 2014/0252687 | A1 | 9/2014 | El-Dasher | |
| 2017/0150602 | A1 * | 5/2017 | Johnston | H05K 1/115 |

FOREIGN PATENT DOCUMENTS

| | | | |
|---|---|---|---|
| EP | 0856393 | 8/1998 | |
| RU | 1084711 A | 4/1984 | |
| RU | 2340705 C2 | 12/2008 | |
| WO | WO-200000921 C2 | 1/2000 | |
| WO | WO2002023962 A2 * | 9/2000 | H05K 3/10 |
| WO | WO-2014088866 C1 | 6/2014 | |
| WO | WO-2015170330 | 11/2015 | |
| WO | WO-2016164729 A1 | 10/2016 | |
| WO | WO-2017023085 | 2/2017 | |

OTHER PUBLICATIONS

Popov V.M. et. al., "Thermal conductivity of polymer materials modified by exposure to physical fields", Modern problems of science and education, 2012, No. 4, 14 pages.

Saphronov, V. et al., "Experimental and Theoretical Study of Residual Deformations and Stresses at Additive Manufacturing by Fusion", Lasers in Manufacturing Conference 2015, Jul. 8, 2014.

* cited by examiner

REDUCING STRESSES IN METAL LAYERS

BACKGROUND

Forming small metal components has traditionally been the domain of machining, with casting and other technologies, e.g., liquid injection molding (LIM) providing other options. Metals provide desirable properties including: mechanical strength, resistance to creep, conductivity, tunable coldwork, etc. While machining has long been the domain of technical specialists, the rise of Computer Numerical Control (CNC) and automated machining has allowed fewer skilled machinists to support an increasing number of machines producing parts. Nevertheless, producing small runs of customized metal parts continues to be a high touch operation with a corresponding high cost.

BRIEF DESCRIPTION OF THE DRAWINGS

The accompanying drawings illustrate various examples of the principles described herein and are a part of the specification. The illustrated examples do not limit the scope of the claims.

Figure 1:
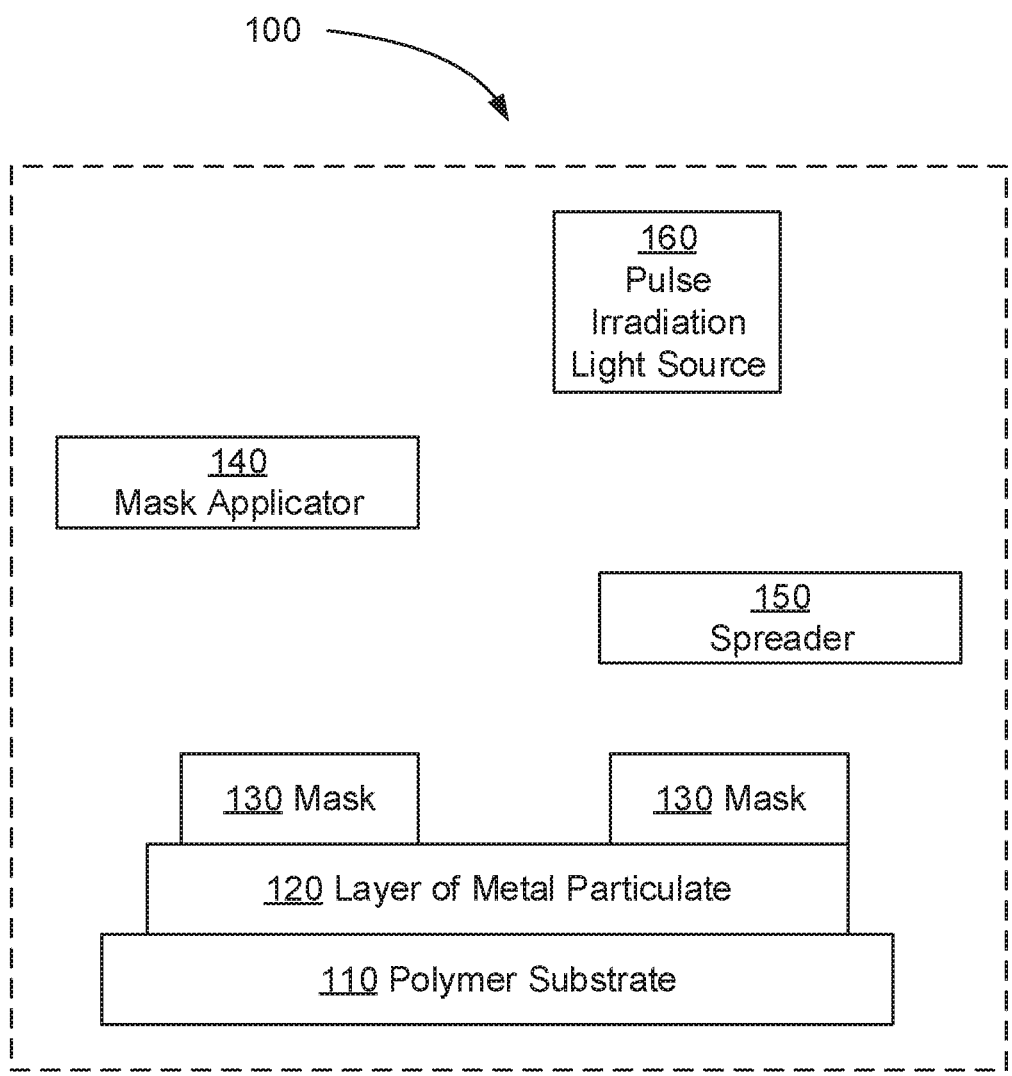
FIG. 1 is a block diagram of a system according to an example consistent with the present specification.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Forming metal components has long been the domain of machining and casting. The development of three-dimensional printing of objects allows the "printing" of polymer components that may be lost wax cast to form metal parts. However, printed polymer components still lack some of the desirable properties of metals, especially creep resistance, conductivity, and ductility. The present specification describes, among other subject matter, a method of three dimensional forming a metal component.

By way of example, a layer of metal particulate is formed on a surface. A mask is selectively applied to the layer of metal particulate. The mask decreases absorption of radiation from a pulse irradiation source. The pulse irradiation light source provides radiation that is converted to heat in the layer of metal particulate: the unmasked portions of the layer melt and consolidate, while the masked portions of the layer do not absorb as much heat and remain particulate. The layer cools and the melted portion of the layer solidifies. Another layer of particulates is formed on top of the previous layer and another mask is applied. The process is repeated, building up a metal object layer by layer until the desired thickness is achieved. The object is then removed from the forming bed. In some cases, additional processes may then be applied to the object, for example: buffing, shot peening, sandblasting, vibratory finishing, electro polishing, coating, annealing, mechanical cold working, etc. Additional processes may also include traditional machining operations.

The use of a pulse irradiation light source that treats the entire metal layer simultaneously provides an advantage in throughput. A pulse irradiation light source may be used in this manner. Unlike, for example, using a laser to raster over the part, which is impacted by the pulse rate and pulse size of the laser, applying a large heating effect allows the target areas of the layer to be melted simultaneously. As throughput is a notable driver for the cost effectiveness of forming methods, the use of a flood type heating increases throughput and reduces time to form a part. Lasers and similar local heating also have the challenge of creating local stress and heat affected zones during heating and cooling.

When the melted consolidated metal solidifies, cracking and bending have been observed. The melted areas are in contact with the adjacent metal particulate laterally, with the substrate below, and with gas, e.g., air, above. The dissipation of the heat from the melted part is dependent on the thermal conductivity of the adjacent materials as well as the thermal temperature difference. The cooling rate and the order in which various portions of the melted metal solidify are a function of the shape and the relative thermal conductivity of the substrate, gas, and metal particulate.

Metals generally have relatively high thermal conductivities, due in part to the ability of electrons to move through the metal atom lattice. Even when accounting for the reduced contact area in more porous metal matrices, relatively high thermal conductivity may be observed. However, has been observed that the thermal conductivity for the metal particle layer may be less than 10% and perhaps as low as 1% of the thermal conductivity of the consolidated metal. Instead of electron migration providing most of the thermal transfer, other mechanisms including radiation transfer appear to be responsible for energy transfer. The result is that the lateral heat transfer appears to be lower than heat transfer into the substrate for metal and/or quartz substrates. This appears to produce the cracking and bending of the initial metal layer(s) and inhibits part formation.

The present specification describes the use of a substrate with a thermal conductivity closer to the thermal conductivity of the metal particle layer in order to produce parts without the warpage and cracking described above. The use of a substrate that softens/melts slightly under the application of heat also tacks down the initial metal layer thereby reducing warping of the metal part.

The use of a substrate with an appropriate thermal conductivity reduces the instances of cracking and warping in the initial metal layer of a three-dimensional printed metal part. Once several layers are built up, the issues of warping go away as the metal part supports the new layers and resists warping. The use of a polymer layer as the substrate, where the polymer layer softens and/or becomes "tacky" when heated as part of the consolidation process, also helps hold the initial metal layer in place and prevent warping. Controlling and/or preventing warping of the developing part facilitates automation, especially the process of forming the layers of metal particulate and not leaving gaps and/or cracks in the formed part.

Among other examples, the present specification describes a system including: a polymer substrate with a thermal conductivity of less than 0.5 W/(m-k); a spreader to form a layer of metal particulate on the polymer substrate; a mask applicator to apply a mask to a portion of the layer of metal particulate; and a pulsed irradiation light source to fuse a portion of the layer of metal particulate not covered by the mask.

Among other examples, this specification also describes a method of forming a metal object, the method including: forming a layer of metal particles on a polymer substrate, wherein the polymer substrate has a lower thermal conductivity than the layer of metal particles; masking a portion of the layer of metal particles; and melting an unmasked portion of the layer of metal particles using a pulse radiation light source.

This specification also describes a method of forming a metal object, the method including: fusing a layer of metal particulate onto a polymer substrate; and forming successive layers of melted metal particulate on top of the layer of metal particulate fused onto the polymer substrate.

Turning now to the figures. FIG. 1 shows a system (100) according to one example consistent with the present specification. A system (100) includes: a polymer substrate (110) with a thermal conductivity of less than 0.5 W/(m-k); a spreader (150) to form a layer of metal particulate (120) on the polymer substrate (110); a mask applicator (140) to apply a mask (130) to a portion of the layer of metal particulate (120); and a pulsed irradiation light source (160) to fuse a portion of the layer of metal the particulate (120) not covered by the mask (130).

The system (100) is a system for forming a metal article. The system (100) forms the metal article layer by layer. A layer of metal particulate (120) is formed by the spreader (150). The mask applicator (140) then applies a mask (130) on a portion of the layer of metal particulate (120). In one example, the mask (130) reduces the absorption of heat from the pulse irradiation light source (160) by the portions of the layer of metal particulate (120) covered by the mask (130). When the pulse irradiation light source (160) irradiates the layer of metal particulate (120), the unmasked portions melt, consolidate, and cool to form a solid metal layer and the masked portions do not melt. This process is then repeated, layer by layer, until the metal article is finished forming. The metal article is then separated from the metal particulate. The metal particulate may be reused.

The substrate (110) is a polymer substrate. A polymer, in the context of this specification and the associated claims, includes amorphous, crystalline, semi-crystalline, and similar states of a polymer.

Experimentation by the inventors has found that when the thermal conductivity of the substrate (110) is more than the thermal conductivity laterally from the unmasked portion of the layer of metal particles (120), cracking and/or warping of the formed metal layer may occur. These defects in the first few layers of the metal article may make forming subsequent layers difficult and may make automation and/or semi-automated processes unfeasible. Once several layers of the metal article have been formed, the metal layers resist warpage of new layers as they solidify.

When the thermal conductivity into the substrate (110) and laterally into the layer of metal particulate (120) are similar, cracking and warping of the solidified metal layer may be reduced and/or prevented. Particle layers may have thermal conductivities substantially below the thermal conductivity of the material. For example, a layer of metal particles may have a thermal conductivity less than 10% of the thermal conductivity of the corresponding metal. A layer of metal particles may have a thermal conductivity less than 1% of the thermal conductivity of the corresponding metal. The actual thermal conductivity of the layer of metal particulate (120) may depend upon a large number of factors, including: the material in the particulate, the size distribution of the particulate, the compaction state of the layer of metal particulate (120), the pulse irradiation light source used, the pulse length, the pulse spectrum, the absorbance profile of the metal particulate, temperature of the bed and/or metal particulate, and the thickness and/or uniformity of the layer of metal particulate (120).

The substrate (110) includes a polymer. The substrate (110) may be a single layer. The substrate (110) may include multiple layers. The substrate (110) has a thermal conductivity of no more than 1.0 W/(m-K). The substrate (110) may have a thermal conductivity of no more than 0.5 W/(m-K). The substrate (110) may have a thermal conductivity of no more than 0.1 W/(m-K). The substrate (110) may have a thermal conductivity of no more than 0.07 W/(m-K). The substrate (110) may have a thermal conductivity of no more than 0.05 W/(m-K).

In one example, a stainless-steel lattice forming the first consolidated layer has an estimated thermal conductivity of 0.01 to 0.10 W/(m-K). In contrast, a layer of particulate (120) made of 30 to 60 micron stainless steel powder may have a thermal conductivity of 3 to 6 W/(m-K). And, stainless steel metal may have a thermal conductivity of 22 to 87 W/(m-K). Thus, a layer of particulate may have roughly 10% of the thermal conductivity of the solid bulk material and the consolidated initial layer and/or layers may have a thermal conductivity that is 10% to 1% or less than the conductivity of the powder layer. Further, the consolidation of the metal layer as a liquid phase, as the mobile metal minimizes surface area, may tend to pull the edges of the consolidated metal away from the adjacent metal particles, forming an air gap that further contributes to the challenge of uniform heat dissipation.

The substrate (110) may include additional materials to modify the thermal conductivity. For example, the substrate (110) may include a thermally insulating material selected from: a nanofiber, an aerated gel, polymer beads, polymer fibers, glass filaments, ceramic particles, nanoparticle polymer powder, and combinations thereof. The substrate (110) may include a thermally conductive material selected from: metal particulate, metalize polymer fibers, particulate, and combinations thereof.

In one example, the substrate (110) includes polyethylene terephthalate (glycol modified) (PEGT). The substrate may include polycarbonate (PC). The substrate (110) may include a thermoplastic and/or a thermoset plastic. Some example thermoplastics include: high density polyethylene (HDPE), poly-methyl-methacrylate (PMMA, acrylic), acrylonitrile butadiene styrene (ABS), polyamides (nylons), polylactic acid (PLA), polyglycolic acid (PGA), polypropylene (PP), polystyrene (PS), and/or polyvinylchloride (PVC). Some suitable thermoset polymers include: epoxies, acrylics, polyethylene terephthalate (PET), other polyesters, polyurethanes, polyphenols, and polyamine resins.

The substrate (110) may be formulated such that a first thermal conductivity through the substrate is equal to a second thermal conductivity through the consolidated layer of metal particulate (120). The first thermal conductivity may be 80% to 120% of the second thermal conductivity. The first thermal conductivity may be 50% to 200% of the second thermal conductivity.

The substrate (110) may be an injection molded part. The substrate (110) may be a cast film. The substrate (110) may be homogenous. The substrate (110) may be heterogeneous.

In one example, the substrate (110) includes a top film of a first polymer and an underlay of a second material.

The substrate (110) may be substantially flat. The substrate (110) may include protrusions, bumps, divots, ridges, trenches and/or other mechanical features to secure the substrate (110) in place, and/or facilitate forming and/or identification of the metal part.

The layer of metal particulate (120) is formed by the spreader (150). The layer of metal particulate (120) may include a single material. The layer of metal particulate (120) may include multiple types of materials. In one example, the multiple types of materials are patterned in the layer in a manner corresponding to the shape of the object being formed. The layer of metal (120) particulate may be a fixed depth. The layer of metal particulate (120) may be of non-uniform depth. The layer of metal particulate (120) may be sloped from one side to the other. A top surface of the layer of metal particulate (120) may be flat and/or parallel to the ground. In one example, the distance between the printhead (140) and the top surface of the layer of metal particulate (120) is uniform across the working area of the layer of metal particulate (120), where the working area is the area that used to produce the consolidated metal part.

The mask may be physically deposited on the top surface of the layer of metal particulate (120). In one example, the mask is deposited using a printhead. The mask may include a variety of materials to reduce absorption of electromagnetic waves from the pulse irradiation light source (160). The mask (130) may use a pigment to reduce absorption of radiation from the pulse irradiation light source (160). In one example, the mask (130) contains titanium dioxide to reduce absorption of energy from the pulse irradiation light source (160). The mask (130) may contain other white pigments, for example: antimony white ($Sb_2O_3$), lithopone, zinc sulfide, zinc oxide, barium sulfate, white leads and/or combinations thereof. The mask (130) may include metalized particles which reduce absorption. The mask (130) may include aluminum, silver, and/or other metal coated particles.

The mask (130) may be soluble in a solution while the metal particles are not soluble in the solution. For example, the mask may be water soluble and a water rinse is used as part of reprocessing the metal particles. The mask may be alcohol soluble and an alcohol rinse used in reprocessing the metal particles.

The mask (130) may be a stencil. The mask (130) may be a disposable layer. The mask (130) may be applied by the mask applicator (140) using a variety of approaches, including stamping, jetting, overlay, and/or other patterning technologies.

The mask applicator (140) may be a printhead. The printhead may be a thermal inkjet (TIJ) and/or a piezoelectric inkjet (PIJ). The jets of the printhead may all be similar in size and properties. The printhead may include a larger size jet for covering large areas of the layer of metal particles (120) to be covered with the mask (130) and the printhead may also include a smaller size jet for outlining the boundary at the edge of the mask (130). In one example, the mask (130) is applied uniformly on all masked areas. The mask (130) may be applied non-uniformly, for example, the boundaries of the masked areas may be given a higher and/or lower density of masking material.

In one example, the printhead (140) makes multiple passes when applying the mask (130). The printhead (140) may apply the mask (130) in a single pass. The pulse irradiation light source (160) may be integrated into the printhead. In one example, the pulse irradiation light source (160) is traversed laterally while heating the unmasked layer of metal particulate (120). The optimum mask application parameters, density of masking components, and heating cycle(s) may vary somewhat depending on the dimensions of the system, the particulate composition and size, and the mask used.

The mask applicator (140) may place a mask (130) over the layer of metal particulate (120). The mask (130) may be a preformed solid piece of material. The mask (130) may be metal, polymer, ceramic, and/or a composite. The mask applicator (140) may apply a series of masks (130) over a series of layers of metal particulate (120). For example, the mask applicator may include a series of flat slides with openings that are sequentially placed over the workpiece. The mask (130) may be a temporary and/or disposable component. For example, the mask (130) may sublimate and/or evaporate under the pulsed irradiation light source (160). The mask (130) may be sublimated and/or evaporated under a secondary pulse after the pulse(s) used to solidify the unmasked portions of the layer of metal particulate have finished. In one example, the mask is formed from water ice and/or dry ice.

The spreader (150) forms a layer of metal particulate (120) on the substrate and on previous layers once the unmasked portions have been consolidated. The spreader (150) may include a leveling blade. The spreader (150) may include a feed for additional particulate to form the layer of metal particulate (120). The spreader (150) may include a vibrating component to distribute and/or compact the layer of metal particulate (120). The spreader (150) may make a single pass to form the layer of metal particulate (120). The spreader may make multiple passes to form the layer of metal particulate (120). In one example, the subsequent passes increase the density of the layer of metal particulate (120). The spreader (150) may be automatic. The spreader (150) may be semi-automatic. The spreader (150) may be manually operated by a user.

The spreader (150) may form layers of metal particulate (120) that are of a uniform depth. The spreader may vary the depth of the formed layer of metal particulate (120) as a function of location in the metal part, location in the bed, and/or feature resolution. In one example, the spreader (150) uses a first thickness for the initial layer and/or the initial few layers and then changes to a second thickness for the remainder of the part.

The spreader (150) may be a roller. The roller may rotate in the direction of motion or opposite the direction of motion. In some examples, the roller aids in compacting the layer of metal particulate (120). The spreader (150) may be a pusher. The spreader (150) may include a leveling blade. The spreader (150) may include multiple rollers, for example, a first roller to level and as a second roller to compact.

The spreader (150) may provide additional functionalities besides spreading of the particulate. The spreader (150) may compact the particulate. The spreader may pattern the particulate. The spreader (150) may apply the particulate. The spreader may heat and/or cool the layer of metal particulate (120) prior to application of the mask (130). The spreader (150) may be combined with the mask applicator (140). In one example, the operation of spreading and patterning with the mask (130) is performed in a single pass.

The spreader (150) may include multiple particle feeds. In one example, the spreader (150) provides a first distribution of particles for the initial layer and a second distribution of particles in subsequent layers. The spreader (150) may apply a first distribution of particles on a first pass and a second distribution of smaller particle on a second pass. The spreader (150) may apply a first distribution of smaller particles near the bottom of the layer and a second distribution including more, larger particles near the top of the layer of metal particles (120). This may allow the use of lower energy inputs from the pulse irradiation light source (160) as the smaller particles have faster kinetics and/or lower melting temperatures than the larger particles. Thus, a temperature gradient within the layer of metal particulate (120) may be accommodated by structuring the layer of metal particulate (120).

The pulse irradiation light source (160) provides energy to melt and/or sinter unmasked portions of the layer of metal particles (120) together while not melting and/or sintering the masked portions of the layer of metal particles (120). The pulse irradiation light source (160) may be static. The pulse irradiation light source (160) may move, for example, the pulse irradiation light source (160) may move from one side of the bed to the other side of the bed. The energy output from the pulse irradiation light source (160) may be pulsed and/or steady state. The energy output from the pulse irradiation light source (160) may be uniform across the layer of metal particulate (120). In other examples, the energy output is non-uniform across the layer of metal particulate (120). The position of the pulse irradiation light source (160) relative to the layer of metal particulate (120) may be adjusted based on the non-uniformity of the output and a shape of the unmasked portions of the layer of unmasked particulate (120). Similarly, the exposure time and/or energy level of the pulse irradiation light source (160) may be adjusted between layers depending on the size, shape, and location of the unmasked portions of the layer of metal particulate (120). The exposure time and/or energy level of the pulse irradiation light source (160) may be adjusted between the first layers, the first few layers, and/or layers after a substantial number of layers have been processed, e.g. eight layers.

The pulse irradiation light source (160) may provide radiation, the radiation being preferentially absorbed to create heat in the unmasked portions of the layer of metal particulate (120). The pulse irradiation light source (160) may be used to modify the properties of the substrate (110). In one example, the pulse irradiation light source (160) may be used to promote chemical reactions such as crosslinking in the substrate (110). The pulse irradiation light source (160) may be used to soften and/or melt a top surface of the substrate (110) to increase the adhesion of metal particulate and/or the consolidated metal part.

The pulse irradiation light source (160) may emit radiation primarily in the visible, ultraviolet (UR), and/or near-infrared (near-IR) range. The pulse irradiation light source (160) may be a gas discharge lamp. Such lamps produce a wide range emission spectrum. The pulse irradiation light source (160) may be a monochromatic source, such as a laser and/or light emitting diode (LED), and/or an assembly of lasers and/or LEDs capable of producing a flood-like irradiation of the target surface. The pulse irradiation light source (160) may have an exposure time of less than 1 millisecond (ms). The exposure time of the pulse irradiation light source (160) may range between 10 s of microseconds (μs) and 100 s of ms, depending on the particular pulse irradiation light source (160) used, the mask (130) material, the geometry of the bed, the thickness of layer of metal particulate (120), the composition and size of the metal particulate, the ratio of masked to unmasked portions of the layer of metal particulate (120), and/or other factors.

Figure 2:
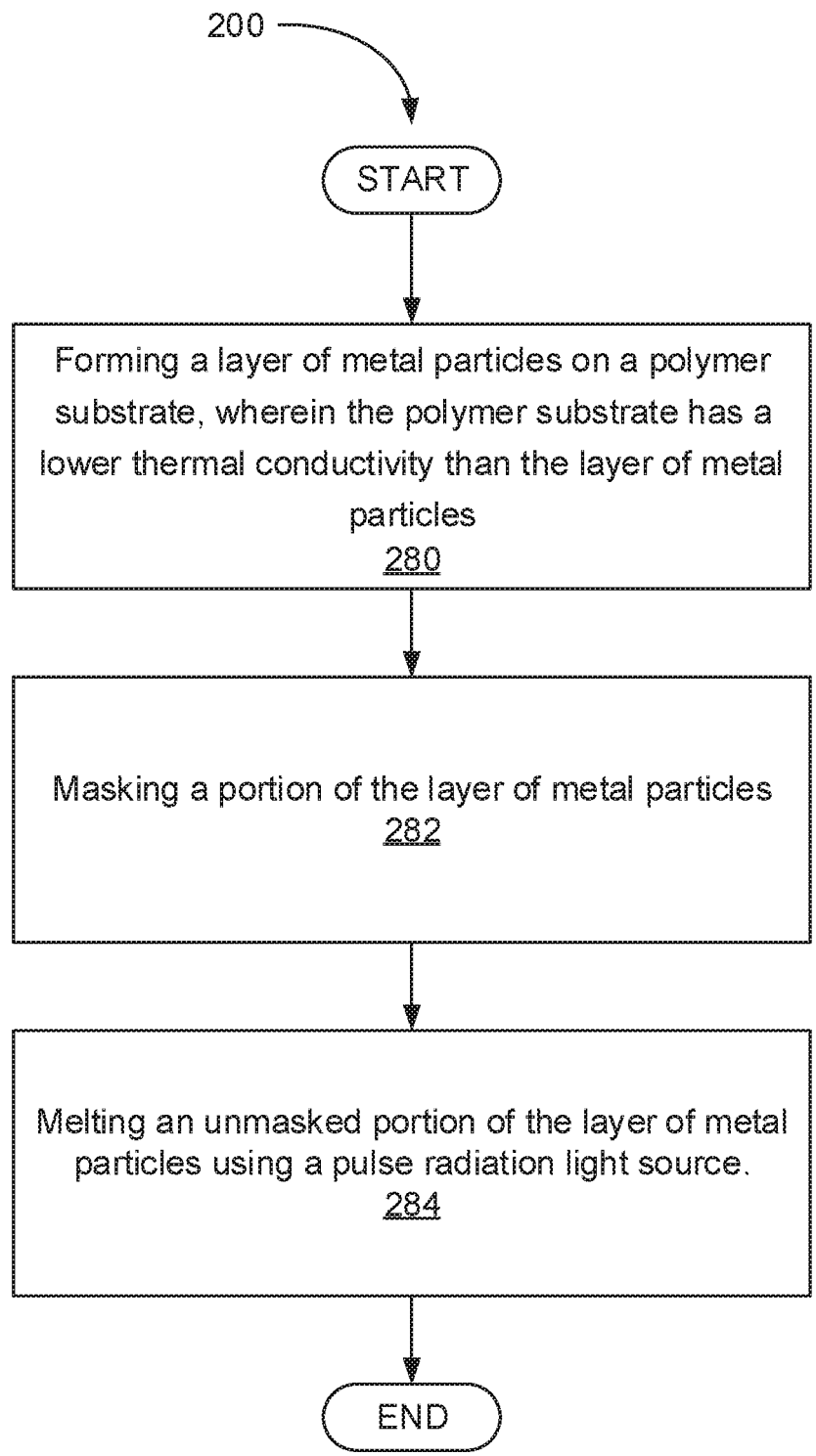
FIG. 2 shows a flow chart for a method of forming a metal object consistent with the present disclosure.

FIG. 2 shows a flow chart for a method (200) of forming a metal object consistent with the present disclosure. The method (200) is a method (200) of forming a metal object. The method (200) includes: forming a layer of metal particles (120) on a polymer substrate (110), wherein the polymer substrate (110) has a lower thermal conductivity than the layer of metal particles (120) (280); masking a portion of the layer of metal particles (120) (282); and melting an unmasked portion of the layer of metal particles (120) using a pulse radiation light source (160) (284).

The method (200) is a method (200) of forming a metal object. The method (200) includes forming a layer of metal particles (120) on a polymer substrate (110), wherein the polymer substrate (110) has a lower thermal conductivity than the layer of metal particles (120) (280). The polymer substrate (110) may be a sheet material. The polymer substrate (110) may be an injection molded part. The polymer substrate (110) may be a composite material containing materials to increase and/or decrease the thermal conductivity of the polymer substrate (110).

The polymer substrate (110) may be heated to soften and/or melt the top surface of the polymer substrate (110) before spreading the layer of metal particles (120). The layer of metal particles (120) may be spread by hand. The layer of metal particles (120) may be spread by a machine. The layer of metal particles (120) may include multiple materials. The layer of metal particles (120) may include metal particles of multiple size distributions.

Spreading a layer of metal particles (120) may further include compacting the layer of metal particles (120). Spreading the layer of metal particles (120) may include making multiple passes from multiple directions to achieve a more uniform layer of metal particles (120). Spreading the layer of meal particles (120) may include patterning the metal particles depending on the planned masked and unmasked areas.

The method (200) includes masking a portion of the layer of metal particles (120) (282). The masking may be performed by applying a mask with a printhead. The masking may be accomplished by placing a template between a pulse irradiation light source (160) and the layer of metal particles (120). The mask (130) may be preformed and applied to the layer of metal particles (120) as a sheet of material. The mask (130) may be designed to evaporate and/or sublimate away after exposure to a pulse irradiation light source (160). In one example, the mask (130) material functions as an ablative protection and the heat application to melt the unmasked portions of the layer of metal particle (120) removes most of the mask (130), for example, by sublimation.

The method (200) includes melting an unmasked portion of the layer of metal particles (120) using a pulse radiation light source (160) (284). The use of a pulse irradiation light source (160) allows the metal particulate to be melted in a relatively short time frame. A pulse irradiation light source (160) may also allow heating of the whole unmasked portion of the layer of metal particles (120) simultaneously, reducing the time to process a layer and the total time to form the metal object. In some example, the pulse irradiation light source (160) may apply multiple pulses. The pulse irradiation light source (160) may use a fixed pulse, i.e. fixed energy and fixed time. The pulse irradiation light source (260) may use a variable pulse where the energy and/or pulse length is varied depending on processing conditions.

The method (200) may further comprise: repeating forming, masking, and melting to build up a multiple layer solid metal object. The method (200) may further comprise removing the polymer substrate from the resulting metal object. Masking a portion of the layer of metal particles (120) may be performed with a printhead. The polymer substrate (110) may be polyethylene terephthalate (glycol modified) (PEGT). The polymer substrate (110) may be polycarbonate. In some examples, the formed metal object is greater than 99% dense without a sintering operation.

In a series of experiments looking at increasing energy levels of pulse irrational light source (160) applied energy, increasing the total amount of energy beyond that used to consolidate the metal particulate may produce cracking and/or warping to a system that functions well at a lower energy. This may be due to the increasing importance of the relative thermal conductivities as more energy is put into the melted regions. Better correlation between the substrate (110) thermal conductivity and the lateral thermal conductivity of the metal film may produce a larger operating window for a process. Similarly, as the metal part accumulates to several layers, e.g., eight layers in one case, the increasing thermal conductivity of the metal may allow a broader range of processing parameters.

In one example, a first set of parameters is used for the first layer and/or first few layers of the metal part and a second set of parameters is used for subsequent layers. For example, the first layer may be operated at a lower energy level and once multiple layers have been accumulated, increasing amounts of energy may be used. The first layer (and/or layers) may have a different layer thickness, composition, and/or other modifications to increase robustness. For example, the initial layer may include a second distribution of metal particulates that provides other parameters. For example, the initial layer may include a higher concentration of smaller particulate and/or a different distribution of particulate entirely. Smaller and/or more uniform metal particulate may result in a more consistent and lower melting energy compared with a larger distribution. The initial layer may include a small amount of a higher conductivity particulate, depending on the planned use of the metal article. For example, the initial layer(s) may include up to 1 wt. % of a thermally conductive metal such as copper (assuming that such a material forms a soluble solution with the other metal particles being used to form the metal object). This initial layer may be removed by a secondary operation, for example, grinding and/or polishing.

The initial layer(s) may use a thinner layer thickness, using a lower energy level and less energy dissipation to avoid cracking and warping. By using a thinner layer, and less energy into the thinner layer, the amount of heat in the consolidated metal that needs to be dissipated laterally through the layer and into the polymer substrate (110) is reduced. Once a sufficient number of base layers are accumulated with a corresponding thickness, the layer thickness may be increased and higher energy pulses used to decrease part forming time without inducing cracking and/or warpage in the metal object being formed.

In another example, the substrate (110) may be warmed prior to forming the layer of metal particulate (120). The layer of metal particulate may be warmed prior to application of the mask (130). This may reduce the thermal gradient between the consolidated areas of the layer of metal particulate (120) and the substrate (110). As heat flux is dependent upon the thermal conductivity and the temperature gradient, reducing the temperature gradient during the first layer and/or layers may reduce cracking and/or warping.

Figure 3:
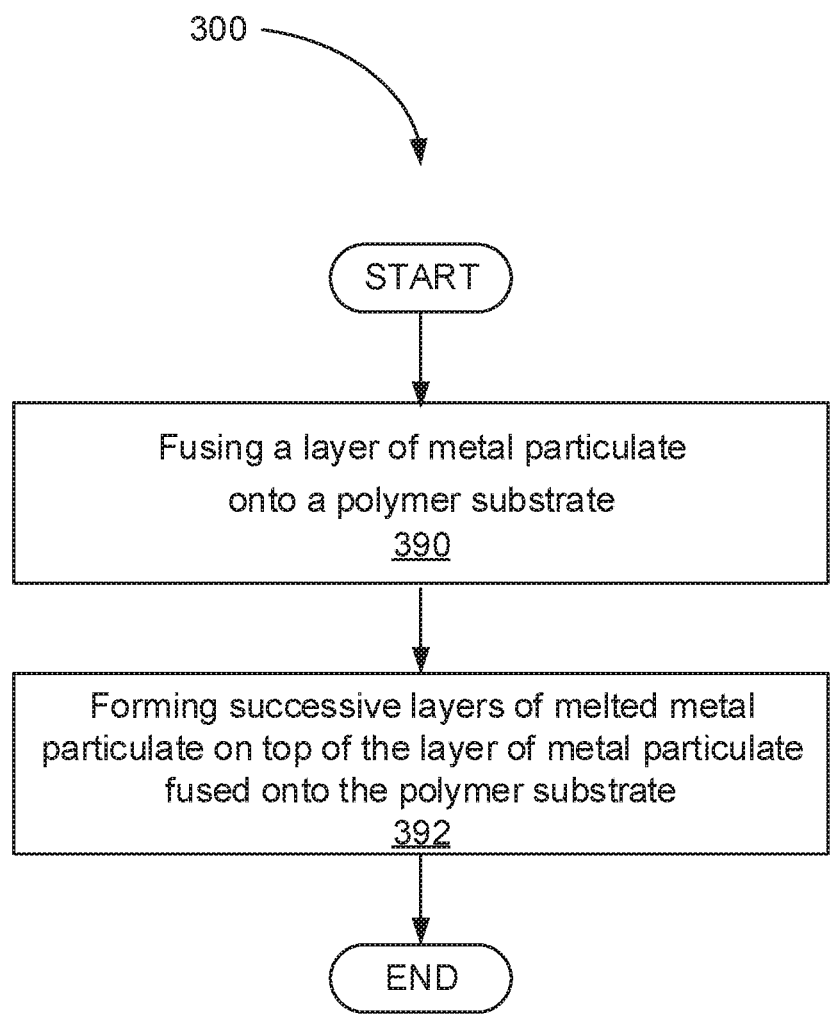
FIG. 3 shows a flow chart for a method of forming a metal object consistent with the present disclosure.

FIG. 3 shows a flow chart for a method (300) of forming a metal object consistent with the present disclosure. The method (300) is a method (300) of forming a metal object. The method (300) includes: fusing a layer of metal particulate (120) onto a polymer substrate (110) (390); and forming successive layers of melted metal particulate on top of the layer of metal particulate (120) fused onto the polymer substrate (110) (392).

The method (300) is a method (300) of forming a metal object. More specifically, the method (300) is a method (300) of reducing cracking and warping in the initial layers of a metal object being formed using layer-by-layer construction.

The method (300) includes fusing a layer of metal particulate (120) onto a polymer substrate (110) (390). The use of a polymer substrate (110) provides two advantages to reduce cracking and warping. First, the polymer substrate (110) has a lower heat transfer coefficient so that the transfer of heat laterally to the other metal particulate and the transfer down into the base are closer. This reduces non-uniformities that may induce cracking and/or warping. The polymer substrate (110) may also tack the metal layer in place, providing mechanical resistance to warping and/or cracking. This tackiness is especially useful for the first layer(s) of the developing structure.

The method (300) also includes forming successive layers of melted metal particulate on top of the layer of metal particulate (120) fused onto the polymer substrate (110) (392). Once the base is in place, additional metal layers may be built up. The substrate (110) still provides the insulation and the accumulating layers providing increasing mechanical strength to resist deformation and warping.

In some examples, a first set of processing conditions is used for the first layer(s) of the metal object and a second, higher energy set of processing conditions is used for layers once a base in place. The energy density used to consolidate the mixed layer may be less than the energy density used to consolidate the successive layers. The strength of the previous layers may stabilize the form against warping. The previous layers may reduce the thermal shocks of heating and/or cooling.

The method (300) may include removing the polymer substrate (110) from the consolidated metal layers. The method (300) may include dissolving the polymer substrate (110) without dissolving the fused layer of metal particulate (120). The method (300) may include melting the polymer substrate (110) to remove the substrate (110) from the metal object. The method (300) may include mechanically removing the polymer substrate (110) from the metal object.

Figure 4:
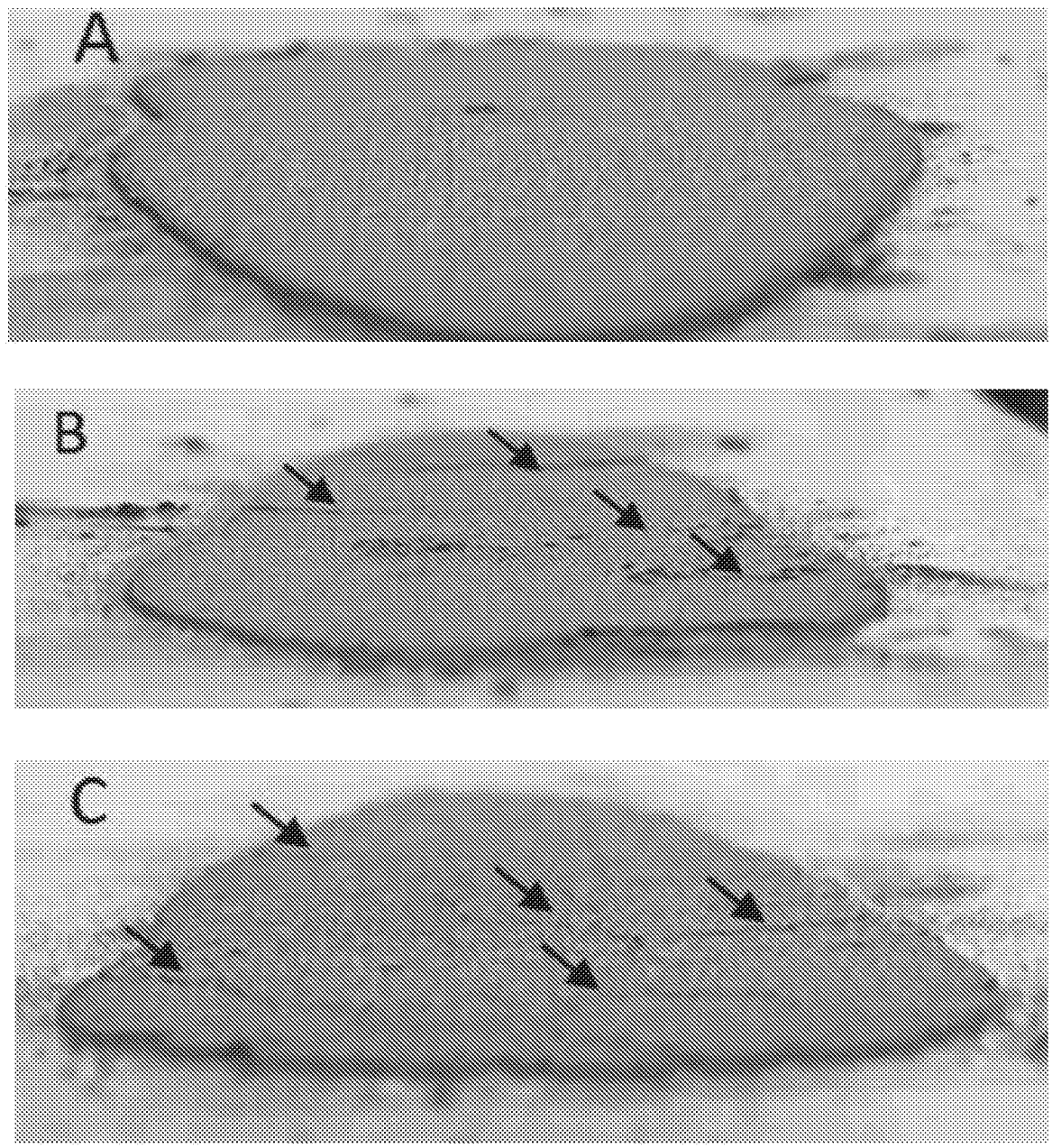
FIGS. 4A-C show images of metal films produced with equipment and methods consistent with the present disclosure.

FIGS. 4A-C show images of metal films produced with equipment and methods consistent with the present disclosure. Each of the three shown metal films shown in FIGS. 4A-4C were produced on a polycarbonate (PC) substrate. The metal films were approximately 100 micrometers (μm) in thickness. The metal films were formed from stainless steel particulate. The layer of metal particulate (120) was exposed to a 10 millisecond (ms) pulse. The film in FIG. 4A had an energy of 28.9 J/cm$^2$. The film in FIG. 4B had an energy of 31.8 J/cm$^2$. The film in FIG. 40 had an energy of 35.8 J/cm$^2$. A higher energy pulse (44.5 J/cm$^2$, not shown) melted the top layer of the polymer which inhibited forming the desired metal film. Thus, the equipment and methods tack the film in place but not melt the polymer substrate. The use of lower energy pulses for the initial layer(s) may be used to reduce cracking and/or warping.

Figure 6:
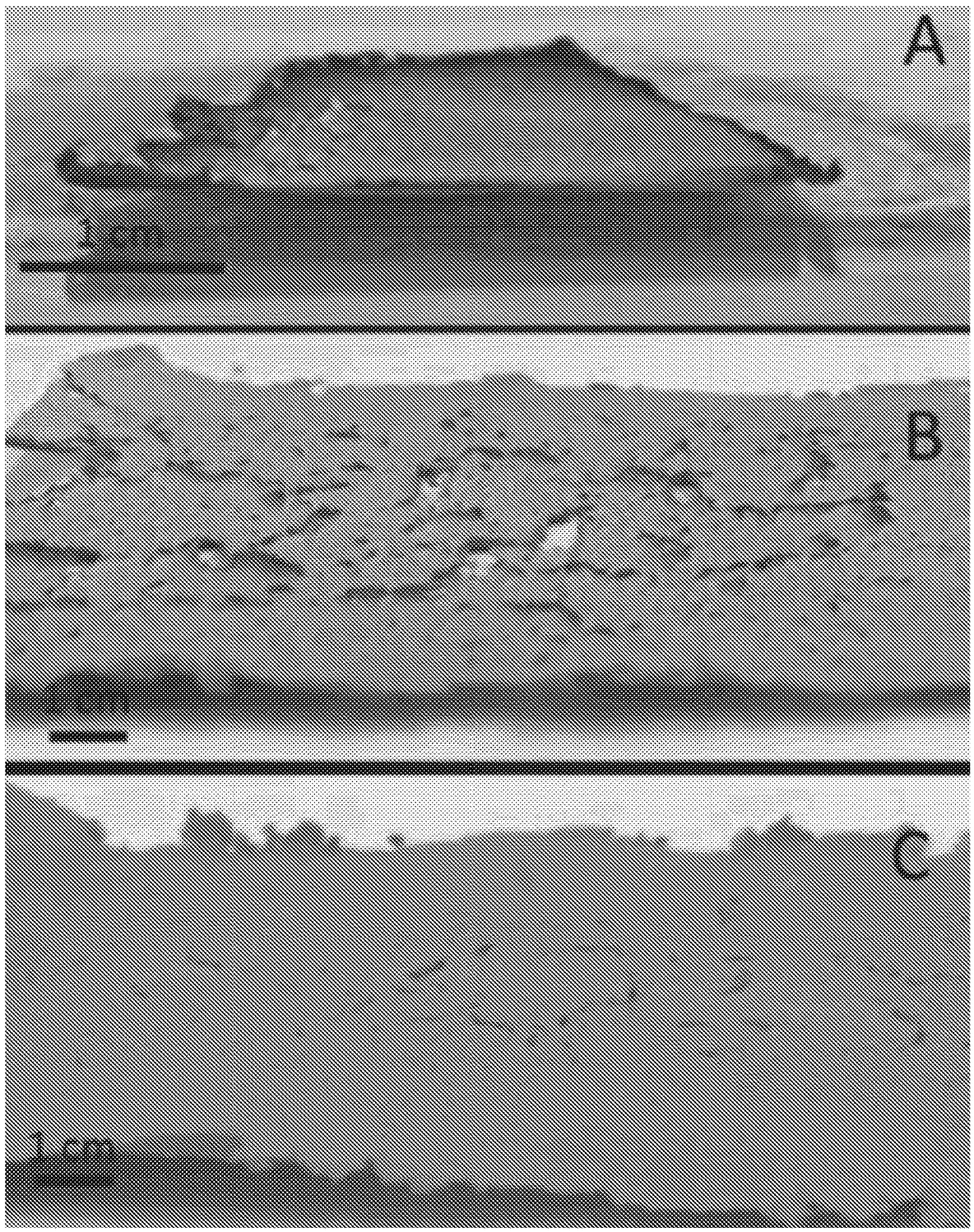
FIGS. 6A-C show images of metal films produced on quartz and metal particulate substrates.

Increasing energy into the film appears to correlate with greater cracking (indicated with the black arrows) of the films. This is consistent with heat dissipation contributing to the cracking. More energy and more heat result in greater thermal gradients and greater impact from differences in heat transfer rates. We note that even the higher energy films shown in FIGS. 4B and 4C are significantly better than the films formed on quartz (FIG. 6A) and/or a metal particulate layer (FIGS. 6B and 6C). This is believed to be due to the lower thermal conductivity of the polycarbonate substrate (approximately 0.05-0.068 W/(m-K)), which is closer to the thermal conductivity rate within the formed film layer. After the first layer(s) are formed and the thermal conductivity of the consolidated film increases, the energy may be increased to operate the process in a more robust operating zone. Higher energy may also facilitate bonding between sequential layers of the multilayer metal object being formed.

Figure 5:
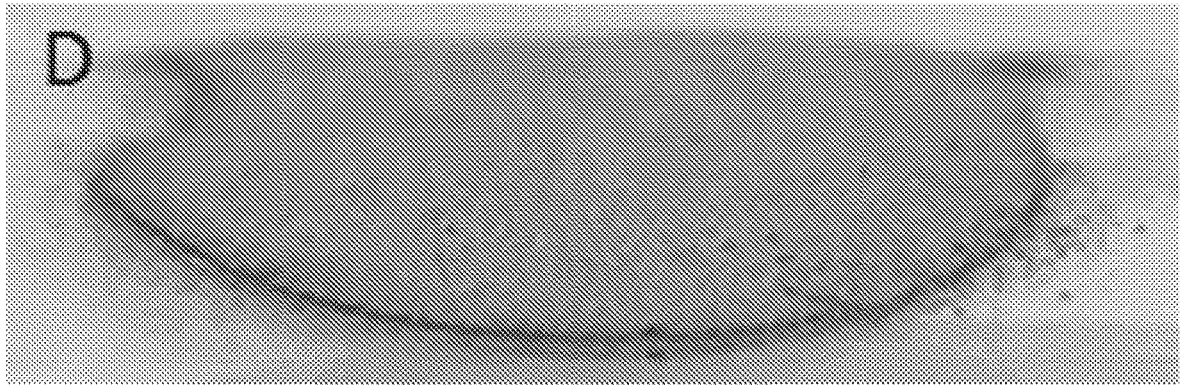
FIGS. 5D-F show images of metal films produced with equipment and methods consistent with the present disclosure.
Figure 5:
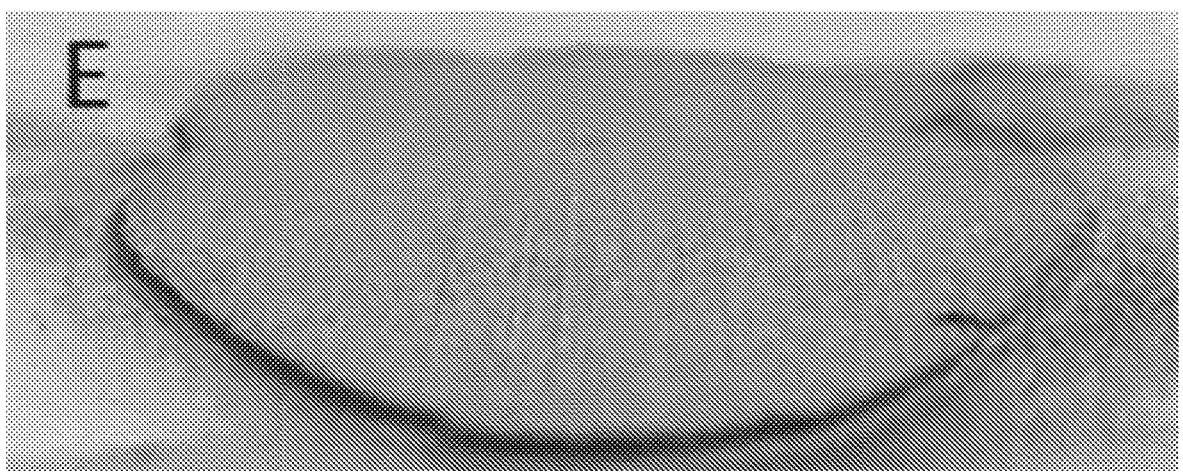
Figure 5:
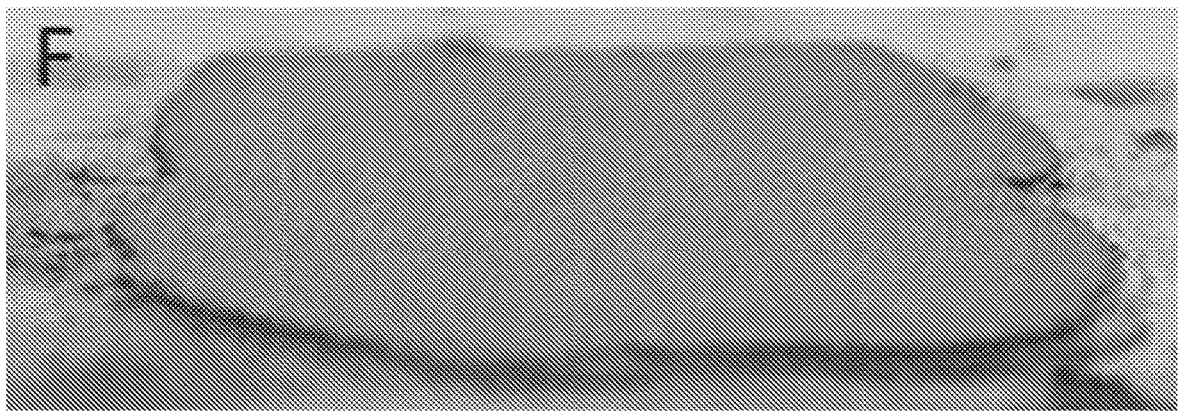

FIGS. 5D-F show images of metal films produced with equipment and methods consistent with the present disclosure. The metal films in FIGS. 5D-5F were produced on a solid PEGT (Polyethylene terephthalate (glycol modified)) substrate. The metal films are approximately 100 micrometers ($\mu$m) thick. The metal films are formed from stainless steel particulate. The films show a lack of cracking and warping, and there are not cracks indicated with black arrows. Solid PEGT has a thermal conductivity of approximately 0.045-0.072 W/(m-K).

FIGS. 5D-5F were produced with a 10 ms pulse. The pulse energy increased from 28.9 J/cm$^2$ in FIG. 5D, to 31.8 J/cm$^2$ in FIG. 5E, and 35.8 J/cm$^2$ in FIG. 5F. While the ranges of thermal conductivity in polycarbonate and PETG overlap, the images and resulting films show that such processes can be sensitive to fairly small changes in the thermal conductivity properties of the substrate. Thus, selecting a solid polymer substrate with a thermal conductivity similar to the thermal conductivity of the newly consolidated metal film is an effective method to increase the robustness and process window for forming consolidated metal films and forming multilayer objects from consolidated metal films.

FIGS. 6A-C show images of metal films produced on quartz and metal particulate substrates. FIG. 6A shows a 100 micrometer film of formed from stainless steel particulate. This film was formed on a solid quartz substrate. Quartz has a higher thermal conductivity than the polycarbonate and/or PEGT, as is estimate to range from 0.54 to 2.8 W/(m-K) depending in part on the quartz's processing history.

Arrows are not provided in FIG. 6A but cracking can be seen, for example, on the left-hand side of the film. The perimeter of the metal film is discolored and warping of the metal film is evident. The warping and cracking appear more prevalent at the edges of the film, where the thermal gradients are believed to be greater. The discoloration is also concentrated at the edges of the film.

FIGS. 6B and 6C show two metal films produced on metal particulate substrates. The metal particulate substrate is estimated to have a thermal conductivity of roughly 3 to 6 W/(m-K) for 30 to 60 micron diameters stainless steel particulate. While these films do not show the same discoloration seen in FIG. 6A, there is widespread cracking and warping. The warping appears to be concentrated near the edges of the films in FIGS. 6B and 6C. Accordingly, compared with the solid polymer substrates, both the quartz and powdered metal particulate substrates appear to produce films with greater cracking and/or warping.

The layer of metal particulate (120) has a density of approximately 50% of the solid metal, Because the metal particulate is melted, very high part densities, for example, above 95% may be achieved without a secondary sintering operation. In some examples, greater than 99% density may be achieved without a secondary sintering operation. Secondary sintering is used in some metal forming techniques to increase the density of the formed metal objects. However, the use of secondary sintering may also result in reduced dimensional stability of the final object, increased minimum tolerances, and/or increased minimum feature size. Accordingly, the ability to form high density metal objects without a secondary sintering operation may provide greater dimensional reproducibility and better compliance with dimensional tolerance for the metal parts.

The preceding description has been presented to illustrate and describe examples of the principles described. This description is not intended to be exhaustive and/or to limit these principles to any precise form disclosed. Many modifications and variations are possible in light of the above teaching.

What is claimed is:

1. A system comprising:
a polymer substrate with a thermal conductivity of less than 0.5 W/(m-k);
a spreader to form a layer of metal particulate on the polymer substrate, wherein a thermal conductivity through the polymer substrate is within a 20% range of a thermal conductivity through the layer of metal particulate;
a mask applicator to apply a mask to a portion of the layer of metal particulate; and
a pulsed irradiation light source to:
melt a top surface of the polymer substrate to increase adhesion of the metal particulate to the polymer substrate; and
fuse a portion of the layer of metal particulate not covered by the mask.

2. The system of claim 1, wherein the polymer substrate has a thermal conductivity of less than 0.1 W/(m-K).

3. The system of claim 1, wherein the polymer substrate comprises surface protrusions to secure the substrate and facilitate formation of a metal part.

4. The system of claim 1, wherein the polymer substrate has a thermal conductivity lower than a thermal conductivity of the metal particulate layer.

5. The system of claim 1, wherein the pulsed irradiation light source is to warm the layer of metal particulate prior to applying the mask.

6. The system of claim 1, wherein the polymer substrate is a composite.

7. The system of claim 1, wherein the mask is to reduce an absorption of heat from the pulsed irradiation light source by portions of the layer of metal particulate covered by the mask.

8. The system of claim 7, wherein the mask comprises titanium dioxide to reduce absorption of energy from the pulsed irradiation light source.

9. The system of claim 1, wherein the mask applicator applies a non-uniform mask to the portion of the layer of metal particulate.

10. The system of claim 1, wherein the mask is a temporary mask that sublimates under the pulsed irradiation light source.

11. The system of claim 1, wherein the pulsed irradiation light source is to vary the energy output across the layer of metal particulate.

12. The system of claim 1, wherein the thermal conductivity through the polymer substrate is equal to the thermal conductivity through the layer of metal particulate.

13. The system of claim 1, wherein the spreader is to:
form a first layer of metal particulate using a first set of parameters; and form a second layer of metal particulate using a second set of parameters.

\* \* \* \* \*